US011989084B2

(12) United States Patent
McLaughlin et al.

(10) Patent No.: US 11,989,084 B2
(45) Date of Patent: May 21, 2024

(54) SELF-HEALING PROCESS CONTROL SYSTEM

(71) Applicant: Honeywell International Inc., Morris Plains, NJ (US)

(72) Inventors: Paul Francis McLaughlin, Ambler, PA (US); Christopher Paul Ladas, Doylestown, PA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 65 days.

(21) Appl. No.: 16/948,565

(22) Filed: Sep. 23, 2020

(65) Prior Publication Data
US 2022/0091922 A1   Mar. 24, 2022

(51) Int. Cl.
*G06F 11/00* (2006.01)
*G05B 19/4155* (2006.01)
(Continued)

(52) U.S. Cl.
CPC ...... *G06F 11/0793* (2013.01); *G05B 19/4155* (2013.01); *G06F 9/45558* (2013.01);
(Continued)

(58) Field of Classification Search
CPC ............ G06F 11/0703; G06F 11/0706; G06F 11/0709; G06F 11/0712; G06F 11/0727; G06F 11/073; G06F 11/0751; G06F 11/0778; G06F 11/0793; G06F 11/14; G06F 11/1489; G06F 11/16; G06F 11/1658; G06F 11/1666; G06F 11/1675; G06F 11/20; G06F 11/2023; G06F 11/2028; G06F 11/203; G06F 11/2033; G06F 11/2043;
(Continued)

(56) References Cited

U.S. PATENT DOCUMENTS

| 4,133,027 A | 1/1979 | Hogan |
| 4,888,726 A | 12/1989 | Struger et al. |

(Continued)

FOREIGN PATENT DOCUMENTS

| CN | 103354190 A | 10/2013 |
| CN | 104241972 A | 12/2014 |

(Continued)

OTHER PUBLICATIONS

Cheatham, Jason A., John M. Emmert, and Stan Baumgart. "A survey of fault tolerant methodologies for FPGAs." ACM Transactions on Design Automation of Electronic Systems (TODAES) 11, No. 2 (2006): 501-533. (Year: 2006).*

(Continued)

*Primary Examiner* — Joseph D Manoskey
(74) *Attorney, Agent, or Firm* — John Maldjian, Esq.; Stevens & Lee PC (57) ABSTRACT

An implementation is for one or more hardware-based non-transitory memory devices storing computer-readable instructions which, when executed by the one or more processors disposed in a computing device, cause the computing device to monitor a logic block and a memory block to detect a fault condition, determine a subset of the logic block or the memory block that is impacted by the fault condition, and perform at least one action on the logic block and the memory block.

20 Claims, 7 Drawing Sheets

(51) Int. Cl.
*G06F 9/455* (2018.01)
*G06F 11/07* (2006.01)
*G06F 11/16* (2006.01)
*G06F 11/20* (2006.01)

(52) U.S. Cl.
CPC ........ *G06F 11/0727* (2013.01); *G06F 11/073* (2013.01); *G06F 11/0751* (2013.01); *G06F 11/0778* (2013.01); *G06F 11/1666* (2013.01); *G06F 11/2028* (2013.01); *G06F 11/2033* (2013.01); *G05B 2219/31368* (2013.01); *G06F 2009/45583* (2013.01)

(58) Field of Classification Search
CPC ............. G06F 11/2046; G06F 11/2048; G06F 9/45558; G06F 2009/45583; G06F 2009/45591; G05B 2219/31368; G05B 19/4155; G05B 19/418
See application file for complete search history.

(56) References Cited

U.S. PATENT DOCUMENTS

| | | | |
|---|---|---|---|
| 4,958,270 | A | 9/1990 | McLaughlin et al. |
| 5,088,021 | A | 2/1992 | McLaughlin et al. |
| 5,361,198 | A | 11/1994 | Harmon et al. |
| 5,432,927 | A | 7/1995 | Grote et al. |
| 5,546,301 | A | 8/1996 | Agrawl et al. |
| 5,933,347 | A | 8/1999 | Cook et al. |
| 5,963,448 | A | 10/1999 | Flood et al. |
| 6,008,985 | A | 12/1999 | Lake et al. |
| 6,088,679 | A | 7/2000 | Barkley |
| 6,138,049 | A | 10/2000 | McLaughlin et al. |
| 6,170,044 | B1 | 1/2001 | McLaughlin et al. |
| 6,272,386 | B1 | 8/2001 | McLaughlin et al. |
| 6,442,663 | B1 | 8/2002 | Sun et al. |
| 6,560,330 | B2 | 5/2003 | Gabriel |
| 7,237,148 | B2 | 6/2007 | Czajkowski et al. |
| 7,313,448 | B2 | 12/2007 | Petrich et al. |
| 7,434,047 | B2 | 10/2008 | Sharma |
| 7,436,797 | B2 | 10/2008 | Shepard et al. |
| 7,515,972 | B2 | 4/2009 | Kumar et al. |
| 7,555,752 | B2 | 6/2009 | Groot et al. |
| 7,577,575 | B1 | 8/2009 | Donner et al. |
| 7,630,777 | B2 | 12/2009 | Rudnick et al. |
| 8,280,530 | B2 | 10/2012 | Kase |
| 8,570,922 | B2 | 10/2013 | Pratt, Jr. et al. |
| 8,676,219 | B2 | 3/2014 | Pratt, Jr. et al. |
| 8,948,067 | B2 | 2/2015 | Chernoguzov et al. |
| 9,128,479 | B2 | 9/2015 | Reichard et al. |
| 9,665,089 | B2 | 5/2017 | Schreder et al. |
| 9,843,624 | B1 | 12/2017 | Taaghoi |
| 9,875,207 | B2 | 1/2018 | Lv et al. |
| 9,935,828 | B2 | 4/2018 | Tal et al. |
| 9,873,346 | B2 | 5/2018 | McLaughlin et al. |
| 9,990,286 | B1 | 6/2018 | McLaughlin et al. |
| 10,175,682 | B2 | 1/2019 | Peake et al. |
| 10,176,606 | B2 | 1/2019 | Jammikunta et al. |
| 10,178,177 | B2 | 1/2019 | McLaughlin et al. |
| 10,237,712 | B2 | 3/2019 | Gopalakrishnan et al. |
| 10,296,515 | B2 | 5/2019 | Nikhra et al. |
| 10,348,704 | B2 | 7/2019 | Figueira |
| 10,354,343 | B2 | 7/2019 | Bodanapu et al. |
| 10,441,832 | B1 | 10/2019 | Trivelpiece et al. |
| 10,565,046 | B2 | 2/2020 | Tran et al. |
| 10,997,113 | B1 | 5/2021 | Reineke et al. |
| 11,036,656 | B2 | 6/2021 | Mclaughlin et al. |
| 2003/0028538 | A1 | 2/2003 | Eikenbery |
| 2004/0158713 | A1 | 8/2004 | Aneweer et al. |
| 2004/0233237 | A1 | 11/2004 | Randow |
| 2005/0022065 | A1* | 1/2005 | Dixon ................. G11C 29/848 714/42 |
| 2005/0022078 | A1* | 1/2005 | Subramanian ...... G06F 11/1666 714/E11.12 |
| 2005/0276233 | A1 | 12/2005 | Shepard et al. |
| 2006/0130021 | A1 | 6/2006 | Plum et al. |
| 2006/0236198 | A1 | 10/2006 | Lintz et al. |
| 2007/0100472 | A1 | 5/2007 | Johnson et al. |
| 2008/0015714 | A1 | 1/2008 | Rudnick et al. |
| 2008/0074998 | A1 | 3/2008 | Becker et al. |
| 2008/0120125 | A1 | 5/2008 | Chavez |
| 2008/0208361 | A1 | 8/2008 | Grgic |
| 2009/0031403 | A1 | 1/2009 | Huang |
| 2009/0222654 | A1 | 9/2009 | Hum et al. |
| 2010/0064137 | A1 | 3/2010 | Mcgrew et al. |
| 2010/0271989 | A1 | 10/2010 | Chernoguzov et al. |
| 2010/0315298 | A1 | 12/2010 | Biswas et al. |
| 2011/0178611 | A1 | 7/2011 | Daraiseh et al. |
| 2011/0258433 | A1 | 10/2011 | Pulini et al. |
| 2012/0076007 | A1 | 3/2012 | Nelson |
| 2012/0078391 | A1 | 3/2012 | Zornio et al. |
| 2012/0117416 | A1 | 5/2012 | Mclaughlin |
| 2012/0300420 | A1 | 11/2012 | Muldowney et al. |
| 2013/0268799 | A1 | 10/2013 | Mestery et al. |
| 2014/0032366 | A1 | 1/2014 | Spitz et al. |
| 2014/0068579 | A1 | 3/2014 | Dawson et al. |
| 2014/0173246 | A1 | 6/2014 | Sandstrom |
| 2014/0173336 | A1 | 6/2014 | Bennah et al. |
| 2014/0245077 | A1 | 8/2014 | Kanso et al. |
| 2014/0298091 | A1 | 10/2014 | Carlen et al. |
| 2015/0018977 | A1 | 1/2015 | Law et al. |
| 2015/0019191 | A1 | 1/2015 | Maturana et al. |
| 2015/0149767 | A1 | 5/2015 | Oualha et al. |
| 2015/0154136 | A1 | 6/2015 | Markovic et al. |
| 2015/0215300 | A1 | 7/2015 | Buonacuore et al. |
| 2015/0278144 | A1 | 10/2015 | McLaughlin et al. |
| 2015/0323910 | A1 | 11/2015 | McLaughlin et al. |
| 2015/0341364 | A1 | 11/2015 | Basso et al. |
| 2015/0378356 | A1 | 12/2015 | Hefeeda et al. |
| 2016/0062350 | A1 | 3/2016 | Prall et al. |
| 2016/0103431 | A1 | 4/2016 | Ganapathi et al. |
| 2016/0139999 | A1 | 5/2016 | Gabler et al. |
| 2016/0299497 | A1 | 10/2016 | McLaughlin et al. |
| 2016/0320759 | A1 | 11/2016 | Macha et al. |
| 2016/0327923 | A1 | 11/2016 | Papenbreer et al. |
| 2017/0126404 | A1 | 5/2017 | Unagami et al. |
| 2017/0185055 | A1 | 6/2017 | Nakajima et al. |
| 2017/0199515 | A1 | 7/2017 | Bhat et al. |
| 2017/0228225 | A1 | 8/2017 | Rachlin |
| 2017/0277607 | A1 | 9/2017 | Samii et al. |
| 2017/0300024 | A1 | 10/2017 | Nixon et al. |
| 2017/0359222 | A1 | 12/2017 | Dutta et al. |
| 2018/0046487 | A1 | 2/2018 | Matters et al. |
| 2018/0121843 | A1 | 5/2018 | Connely, IV et al. |
| 2018/0259923 | A1 | 9/2018 | De et al. |
| 2018/0299873 | A1 | 10/2018 | Chauvet et al. |
| 2018/0321662 | A1 | 11/2018 | Nixon et al. |
| 2018/0324609 | A1 | 11/2018 | Diancin |
| 2018/0364673 | A1 | 12/2018 | Van et al. |
| 2019/0042378 | A1 | 2/2019 | Wouhaybi et al. |
| 2019/0050342 | A1 | 2/2019 | Drayton |
| 2019/0056719 | A1* | 2/2019 | Ong ................. G05B 19/4185 |
| 2019/0102226 | A1 | 4/2019 | Caldato et al. |
| 2019/0104437 | A1 | 4/2019 | Bartfai-Walcott et al. |
| 2019/0140989 | A1 | 5/2019 | Wise et al. |
| 2019/0174207 | A1 | 6/2019 | Cella et al. |
| 2019/0179678 | A1 | 6/2019 | Banerjee et al. |
| 2019/0245716 | A1 | 8/2019 | Coombes et al. |
| 2019/0274084 | A1 | 9/2019 | Daniels et al. |
| 2019/0324874 | A1 | 10/2019 | Gill et al. |
| 2019/0340269 | A1 | 11/2019 | Biernat et al. |
| 2019/0370118 | A1 | 12/2019 | Salapura et al. |
| 2020/0012569 | A1 | 1/2020 | Natanzon et al. |
| 2020/0026575 | A1 | 1/2020 | Guim et al. |
| 2020/0029086 | A1 | 1/2020 | Zou et al. |
| 2020/0103861 | A1 | 4/2020 | Flood |
| 2020/0104153 | A1 | 4/2020 | Shibayama et al. |
| 2020/0127411 | A1 | 4/2020 | Pakimo et al. |
| 2020/0136943 | A1 | 4/2020 | Banyai et al. |
| 2020/0236162 | A1 | 7/2020 | Bouzon et al. |
| 2020/0253067 | A1 | 8/2020 | Pakimo et al. |
| 2020/0310394 | A1 | 10/2020 | Wouhaybi et al. |
| 2020/0313960 | A1 | 10/2020 | Rosa-Bian et al. |
| 2020/0319623 | A1 | 10/2020 | McLaughlin et al. |

(56) References Cited

U.S. PATENT DOCUMENTS

| | | |
|---|---|---|
| 2020/0333765 A1 | 10/2020 | Biernat et al. |
| 2021/0096759 A1 | 4/2021 | Thakkilapati |
| 2021/0152495 A1 | 5/2021 | Craig et al. |
| 2022/0138335 A1 | 5/2022 | Rachlin |

FOREIGN PATENT DOCUMENTS

| | | |
|---|---|---|
| CN | 109522051 A | 3/2019 |
| EP | 0416891 A2 | 3/1991 |
| EP | 2184903 A1 | 5/2010 |
| EP | 3789834 A1 | 3/2021 |
| GB | 2404261 A | 1/2005 |
| WO | 9423367 A1 | 10/1994 |
| WO | 2011041413 A1 | 4/2011 |
| WO | 2015169352 A1 | 11/2015 |
| WO | 2017064560 A1 | 4/2017 |
| WO | 2019227401 A1 | 12/2019 |

OTHER PUBLICATIONS

T. Panhofer and M. Delvai, "Self-Healing Circuits for Space-Applications," 2007 International Conference on Field Programmable Logic and Applications, Amsterdam, Netherlands, 2007, pp. 505-506, doi: 10.1109/FPL.2007.4380701. (Year: 2007).*

M. R. Boesen, J. Madsen and D. Keymeulen, "Autonomous distributed self-organizing and self-healing hardware architecture—The eDNA concept," 2011 Aerospace Conference, Big Sky, MT, USA, 2011, pp. 1-13, doi: 10.1109/AERO.2011.5747476. (Year: 2011).*

C. Popa and A. Stan, "A self-healing single core architecture using dynamically reconfigurable devices," 2012 16th International Conference on System Theory, Control and Computing (ICSTCC), Sinaia, Romania, 2012, pp. 1-6. (Year: 2012).*

G. D. Moiş, M. Hulea, S. Folea and L. Miclea, "Self-healing capabilities through wireless reconfiguration of FPGAs," 2011 9th East-West Design & Test Symposium (EWDTS), Sevastopol, Ukraine, 2011, pp. 22-27, doi: 10.1109/EWDTS.2011.6116410. (Year: 2011).*

M. Balaz and S. Kristofik, "Generic Self Repair Architecture with Multiple Fault Handling Capability," 2015 Euromicro Conference on Digital System Design, Madeira, Portugal, 2015, pp. 197-204, doi: 10.1109/DSD.2015.118. (Year: 2015).*

Yu-jen Huang, Da-ming Chang and Jin-fu Li, "A Built-In Redundancy-Analysis Scheme for Self-Repairable RAMs with Two-Level Redundancy," 2006 21st IEEE International Symposium on Defect and Fault Tolerance in VLSI Systems, Arlington, VA, USA, 2006, pp. 362-370, doi: 10.1109/DFT.2006.6. (Year: 2006).*

A. Alzahrani and R. F. DeMara, "Fast Online Diagnosis and Recovery of Reconfigurable Logic Fabrics Using Design Disjunction," in IEEE Transactions on Computers, vol. 65, No. 10, pp. 3055-3069, Oct. 1, 2016, doi: 10.1109/TC.2015.2513762. (Year: 2016).*

Vierhaus, Heinrich Theodor. "Combining fault tolerance and self repair in a virtual TMR scheme." In 2013 Signal Processing: Algorithms, Architectures, Arrangements, and Applications (SPA), pp. 12-18. IEEE, 2013. (Year: 2013).*

T. Koal, H. T. Vierhaus and D. Scheit, "A Concept for Logic Self Repair," 2009 12th Euromicro Conference on Digital System Design, Architectures, Methods and Tools, Patras, Greece, 2009, pp. 621-624, doi: 10.1109/DSD.2009.238. (Year: 2009).*

C. Gleichner, T. Koal and H. T. Vierhaus, "Effective logic self repair based on extracted logic clusters," Signal Processing Algorithms, Architectures, Arrangements, and Applications SPA 2010, Poznan, Poland, 2010, pp. 1-6. (Year: 2010).*

M. B. Tahoori, "High Resolution Application Specific Fault Diagnosis of FPGAs," in IEEE Transactions on Very Large Scale Integration (VLSI) Systems, vol. 19, No. 10, pp. 1775-1786, Oct. 2011, doi: 10.1109/TVLSI.2010.2056941. (Year: 2011).*

"Experian CEE-based Controllers and I/O Overview, Doc# EP03-290-400, Release# 400", Honeywell—Technical Information, Version 1.0, Jul. 2010 (43 pages total).

Thomas Goldschmidt et al, "Container-based architecture for flexible industrial control applications", Journal of Systems Architecture, NL, (Mar. 6, 2018), vol. 84, doi:10.1016/j.sysarc.2018.03.002, ISSN 1383-7621, pp. 28-36, XP055516260 (9 pages total).

Richter Daniel et al, "Highly-Available Applications on Unreliable Infrastructure: Microservice Architectures in Practice", 2017 IEEE International Conference on Software Quality, Reliability and Security Companion (QRS-C), IEEE, (Jul. 25, 2017), doi:10.1109/QRS-C.2017.28, pp. 130-137, XP033139427 (8 pages total).

Extended European Search Report dated Nov. 17, 2020 issued in connection with corresponding EP Application No. 20180114.9 (9 pages total).

Extended European Search Report dated Aug. 2020 issued in connection with corresponding EP Application No. 20166066.9 (7 pages total).

Wikipedia, "DNA Rail"; Retrieved from "https://en.wikipedia.org/w/index.php?title=DIN_rail&oldid=946791884", Retrieved on: Sep. 23, 2020 (4 pages total).

"Everything You Need to Know About DIN Rails", RS Components, downloaded Apr. 21, 2020, https://uk.rs-online.com Retrieved on: Sep. 23, 2020 (5 pages total).

Honeywell, High-Performance Process Manager Planning, HP02-500, Release 530, CE Compliant, Revision 05—Mar. 20, 1998 (330 pages total).

Arnold Offner, "Din-Rail in the Electrical Control Cabinet and Junction Box", Presented on Nov. 12, 2008 at the IEEE SC2 Committee Meeting in Tucson, Arizona. (13 pages total).

"DeltaV™ Virtualization—High Availability and Disaster Recover", DeltaV Distributed Control System, Whitepaper, Emerson Process Management, Oct. 2014 (10 pages total).

Extended European Search Report dated Mar. 21, 2022 issued in connection with corresponding EP Application No. 21205397.9 (9 pages total).

Extended European Search Report dated Mar. 10, 2022 issued in connection with corresponding EP Application No. 21195635.4 (18 pages total).

Indian Examination Report dated Apr. 11, 2022, issued in connection with corresponding Indian Application No. 202114041005 (8 pages total).

"Experion CEE-based Controllers and I/O Overview, Doc # EP03-290-400, Release # 400", Jul. 2010, Version 1.0 (retrieved from https://www.nexinstrument.com/assets/images/pdf/TK-PR.pdf on Sep. 4, 2020) (43 pages total).

Australian Examination Report dated Sep. 1, 2022, issued in connection with corresponding AU application No. 2021229183 (3 pages total).

European Examination Report dated Feb. 11, 2022, issued in connection with corresponding EP Application No. 20165415.9 (10 pages total).

Extended European Search Report dated Jul. 9, 2021 for corresponding EP Application No. 21164736.7 (8 pages total).

Extended European Search Report dated Aug. 20, 2021, issued in connection with corresponding European Patent Application No. 21165382.9 (10 pages total).

Extended European Search Report dated Jul. 27, 2020, issued in connection with corresponding European Patent Application No. 20165416.7 (9 pages total).

Extended European Search Report dated Jun. 29, 2021, issued in connection with corresponding European Patent Application No. 21156993.4 (8 pages total).

Extended European Search Report dated Nov. 18, 2021, issued in connection with corresponding European Patent Application No. 21177860.1 (8 pages total).

Extended European Search Report dated Oct. 23, 2020, issued in connection with corresponding European Patent Application No. 20180113.1 (8 pages total).

Extended European Search Report dated Sep. 21, 2021, issued in connection with corresponding European Patent Application No. 21164739.1 (8 pages total).

(56) References Cited

OTHER PUBLICATIONS

Indian Examination Report dated Feb. 14, 2022; issued in connection with corresponding Indian Application No. 202114012845 (7 pages total).
Indian Examination Report dated Feb. 7, 2022; issued in connection with corresponding Indian Application No. 202114013519 (6 pages total).

* cited by examiner

SELF-HEALING PROCESS CONTROL SYSTEM

CROSS-REFERENCE TO RELATED APPLICATIONS

This application incorporates by reference in its entirety, application Ser. No. 16/377,237 entitled "CONTROL HIVE ARCHITECTURE ENGINEERING EFFICIENCY FOR AN INDUSTRIAL AUTOMATION SYSTEM", filed Apr. 7, 2019 ("HIVE Patent") and application Ser. No. 16/502,692 entitled "REDUNDANT CONTROLLERS OR INPUT-OUTPUT GATEWAYS WITHOUT DEDICATED HARDWARE", filed Jul. 3, 2019 ("Redundancy Patent").

BACKGROUND

A process control system is used by a variety of industries to achieve a production level of consistency, efficiency, and safety, which could not be achieved purely by human manual control. It is implemented widely in industries such as oil refining, pulp and paper manufacturing, chemical processing and power generating plants. For example, a process control system can sit in proximity to a plant, and can manipulate a valve, start a motor, run a chiller or mixing unit as needed.

Process control systems are required to diagnose control equipment faults, to prevent an unmanaged problem such as improper control action. One example is a watchdog timer. A watchdog timer can take actions, such as taking a machine to its prescribed fail state if the timer expires due to a hardware or in some cases a software fault. It might, for example, initiate closing a valve, stopping a motor, or maintaining the last controlled state of the device. A maintenance engineer can use an optimal replacement unit to replace the faulty part that caused the watchdog timer to time out. Software is used to refresh the watchdog timer to let the electronics know that the processor and its executable code is still behaving properly. This is a traditional method that requires manual intervention by a human to restore full operation including redundancy of the control electronic.

A problem arises when there is a transitory fault, such as a bus fault on a memory line between a program and a processor. In such a case, a software refresh of a watchdog timer will not fix the problem. One solution to this problem is to use redundancy, but when a fault occurs, the control device is in a non-redundant mode of operation such that a second fault will cause loss of automatic control. It is preferable to self-heal the faulty device and restore full redundancy (if redundant) or restore/maintain automatic operation even when non-redundant.

SUMMARY

One implementation is a method which includes monitoring a logic block and a memory block to detect a fault condition, determining a subset of the logic block or the memory block that is impacted by the fault condition, swapping the subset of the logic block or the memory block for a second logic block or a second memory block, the second logic block or the second memory block being capable of carrying out the functions of the subset of the logic block or the memory block, disabling the subset of the logic block or the memory block, automatically repairing the subset of the logic block or the memory block, and performing at least one action with respect to the subset of the logic block or the memory block.

Another implementation is for a device comprising a monitor module configured to monitor a logic block and a memory block to detect a fault condition, a fault location module configured to determine a subset of the logic block or the memory block that is impacted by the fault condition, a swap module configured to swap the subset of the logic block or the memory block for a highly integrated virtual environment (HIVE), the HIVE being capable of carrying out the functions of the subset of the logic block or the memory block, an orchestrator module configured to disable the subset of the logic block or the memory block, and a repair module configured to perform at least one action with respect to the subset of the logic block or the memory block.

Another implementation is for one or more hardware-based non-transitory memory devices storing computer-readable instructions which, when executed by the one or more processors disposed in a computing device, cause the computing device to monitor a logic block and a memory block to detect a fault condition, determine a subset of the logic block or the memory block that is impacted by the fault condition, and perform at least one action on the logic block and the memory block.

DETAILED DESCRIPTION OF THE INVENTION

Figure 1:
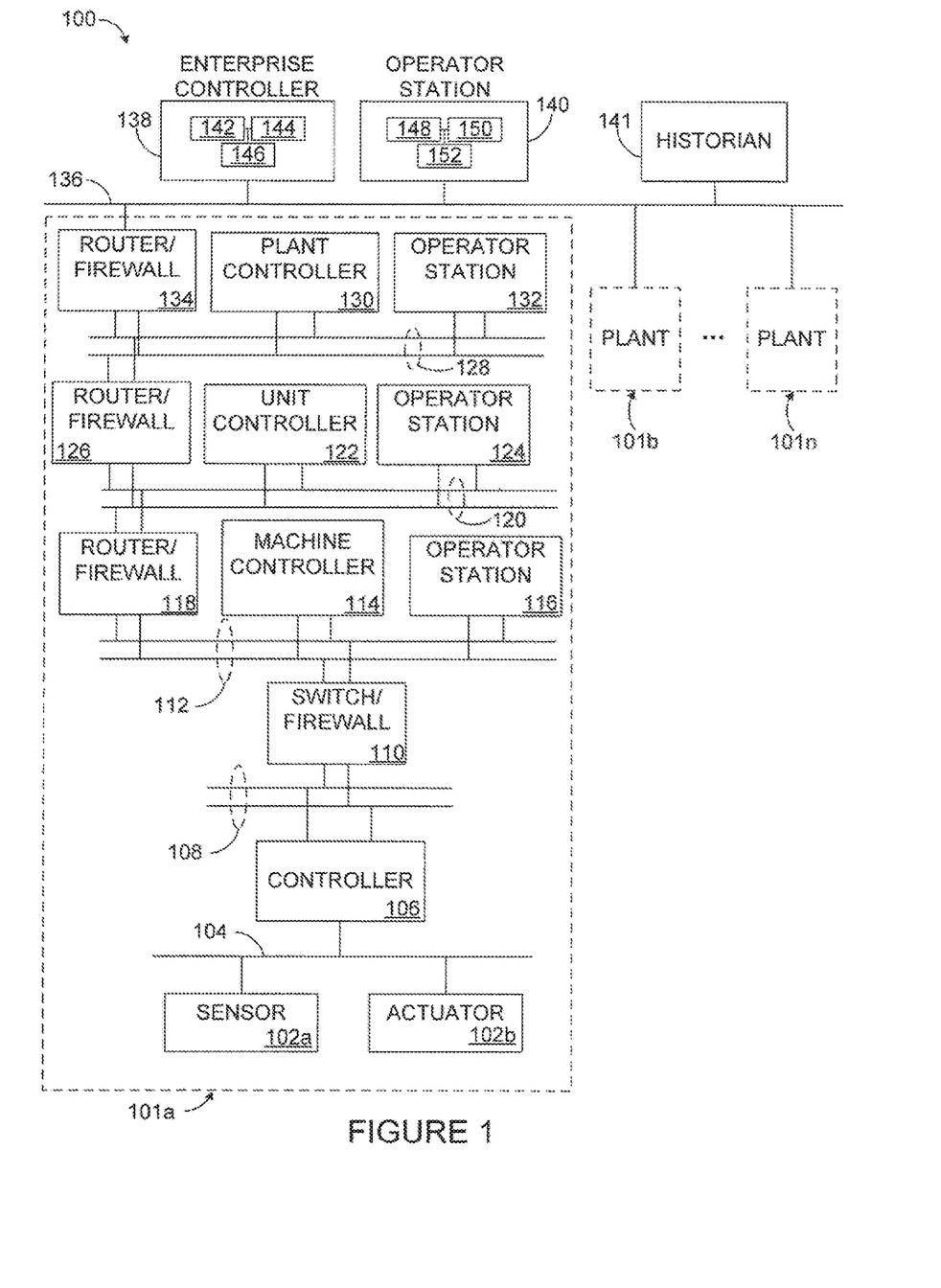
FIG. 1 is a simplified block diagram of an industrial automation system.

FIG. 1 illustrates an example industrial automation system 100 according to this disclosure. As shown in FIG. 1, the system 100 includes various components that facilitate production or processing of at least one product or other material. For instance, the system 100 is used here to facilitate control over components in one or multiple plants 101*a*-101*n*. Each plant 101*a*-101*n* represents one or more processing facilities (or one or more portions thereof), such as one or more manufacturing facilities for producing at least one product or other material. In general, each plant 101*a*-101*n* may implement one or more processes and can individually or collectively be referred to as a process system. A process system generally represents any system or portion thereof configured to process one or more products or other materials in some manner. In FIG. 1, the system 100 is implemented using the Purdue model of process control. It should be noted however, that an architecture that conforms to the Purdue model is not required. A flat architecture with substantially all of its components on one communication network can also be used.

In addition, some circuit components and designs allow for hardware reset. This may include full power reset of select subsystems at any level (see, for example, levels 1-5 of the Purdue model or other process control system). By way of example, since electronic design component geometries have shrunk and been laid out in multiple layers, a new class of faults are resistant to classic on-line correction (e.g. memory parity EDAC and ECC) but which are transitory faults that do not reoccur once corrected. An example is bit latching, where one or more RAM bits latch and persist in an incorrect and non-correctable state, without a full hardware circuit power-cycle. Another example is a soft error in the gate or memory of a field-programmable logic (FPL), a field-programmable gate array (FPGA), or a system-on-chip device (SoC), which also persists in an incorrect and non-correctible state without a full hardware circuit power-cycle.

In previous designs, such a fault would force the device to enter a failure state requiring human servicing (e.g. physical device removal and replacement). As process control and other industrial automation devices become both more integral to the manufacturing operation, as well as physically distant from human-manned central control rooms, it is essential to repair this class of transitory fault in a manner that is as autonomous and self-healing at any level of any plant 101a-101n, including a machine controller 114, a unit controller 122, a plant controller 130, or any other controller.

Figure 2:
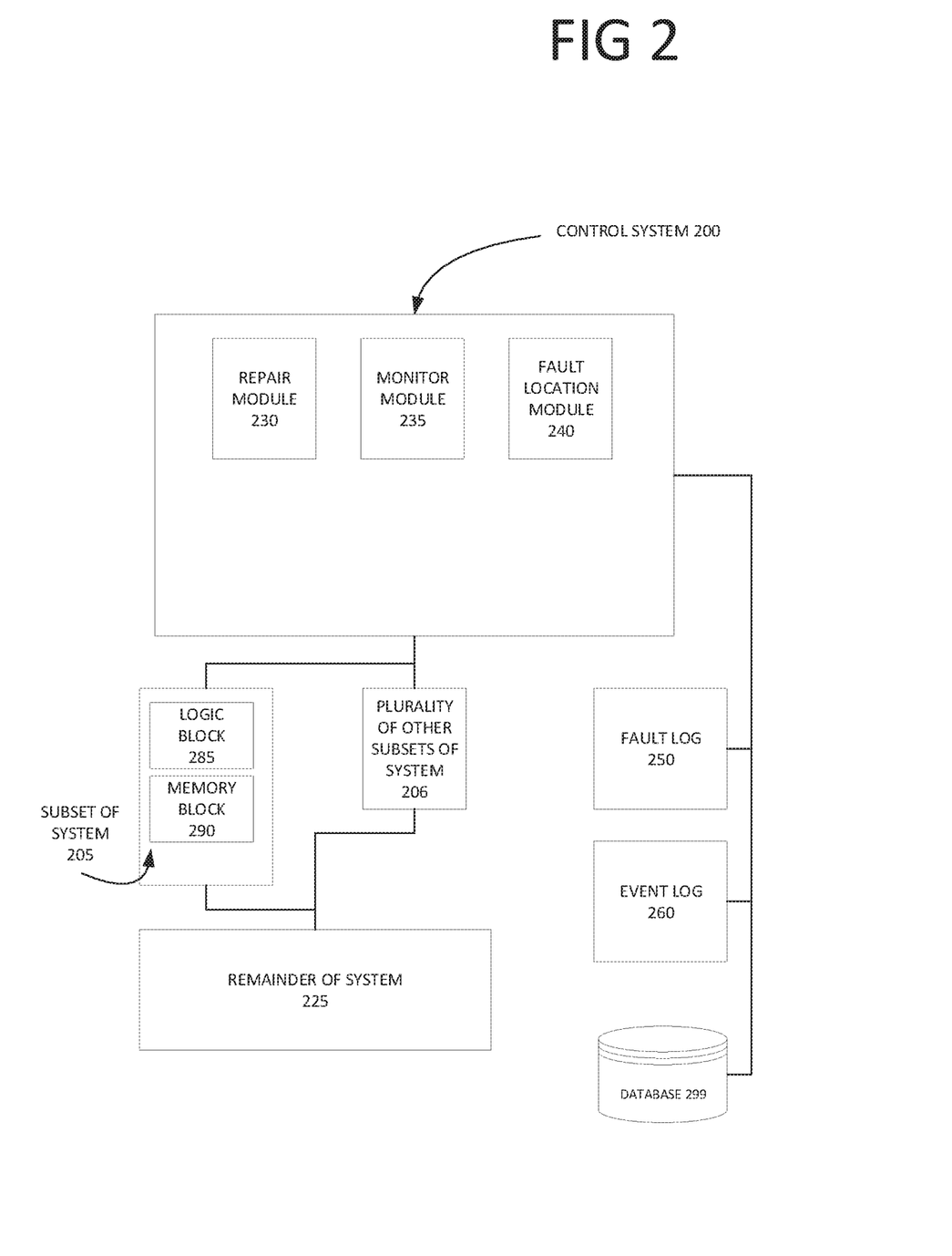
FIG. 2 is a simplified block diagram of a self-healing control system.

FIG. 2 is a simplified block diagram of self-healing control system 200. FIG. 2 is capable of correcting the above-described transitory fault class in a manner that does not require human intervention. The self-healing control system 200 of FIG. 2 is coupled to a subset of a system 205 and a remainder of the system 225. The subset of the system 205 includes a logic block 285 and a memory block 290. A fault condition might occur in either of the logic block 285 or the memory block 290, or both. For simplicity, a fault condition may be referred to as occurring in the subset of the system 205, but it is implied that the fault condition occurs in one of the logic block 285 the memory block 290, or both.

The self-healing control system includes a monitor module 235. In operation, the monitor module 235 waits until the subset of the system 205 fails. For example, the subset of the system 205 could enter a fail state and have stuck bits. In this case, the monitor module 235 detects that there is a fault in the system. The fault location module 240 determines that the subset of the system 205 has entered the fail state. In the present example, a plurality of additional subsets of the system 206 do not enter a fail state. It is the task of the fault location module 240 to identify which of the subsets has entered the fail state. The subsets of the system 205 and 206 include circuitry, software, memory, and/or firmware in which stuck bits are possible in some error states.

When one of the subsets of the system 205 or 206 enters a fail state (in this case it is assumed that subset 205 fails), a repair module corrects the fault condition and returns the system to a normal state. For example, repair module 230 can cause subset 205 to automatically reboot from its stored program memory. In this manner, the fault can be cleared through memory subsystem power of the failed subset of the system, 205. In another example, the repair module 230 can repair a failed node in the subset of the system 205 with a stuck bit, by resetting the memory and restoring a database 299. Once the repair module 230 repairs the failed node it can return the system to an operational status.

Control system 200 also can write to a fault log 250 and an event log 260. In one example, when the control system 200 automatically repairs the subset 205, it also updates the fault log 250. The fault log 250 can be sent to the database 299 so there is a record of each action the control system 200 takes. In the example where control system 200 performs successive repairs on the subset of the system 205 and/or the same fault it updates the event log 260. The event log 260 can be used by a human operator to understand that a portion of the overall system has degraded behavior and might need to take additional actions.

Figure 3:
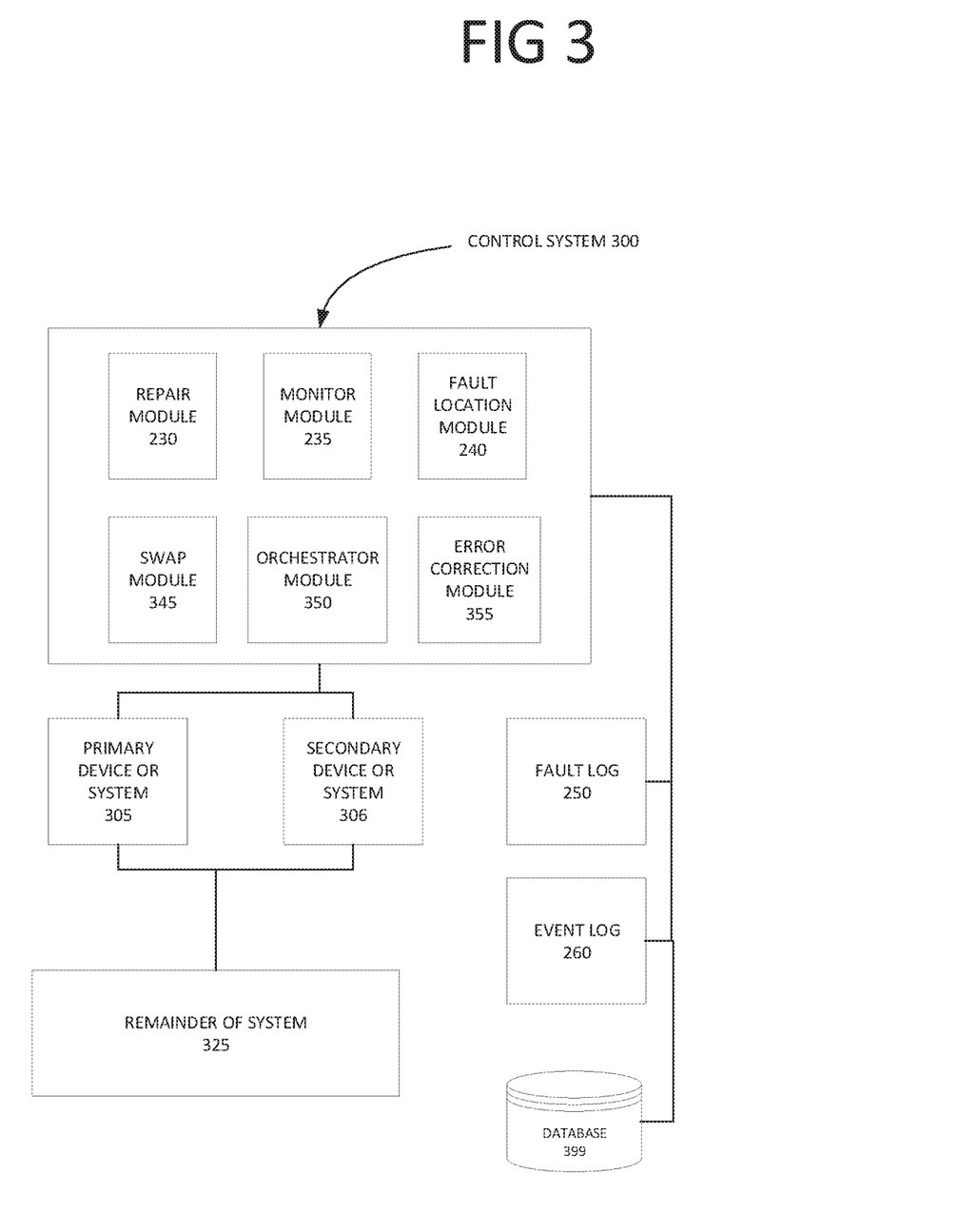
FIG. 3 is a simplified block diagram of the self-healing control system.

FIG. 3 is a simplified block diagram of self-healing control system 300. FIG. 3 is capable of correcting the above-described transitory fault class in a manner that does not require human intervention. The self-healing control system 300 of FIG. 3 is coupled to a primary device or system 305 and a secondary device or system 306. The primary and secondary devices or systems 305 and 306 are coupled to the remainder of the system 325. The self-healing control system includes a monitor module 235. In operation, the monitor module 235 waits until some subset of the system fails. In this example, it is assumed that the primary device or system 305 enters a fail state.

For example, the primary device or system 305 have stuck bits. In this case, the monitor module 235 detects that there is a fault in the system. The fault location module 240 determines that the primary device or system 305 has entered the fail state. Since the primary device or system 305 is in a fail state, a swap module 345 replaces the primary device or system 305 with the secondary device or system 306. An orchestrator module 350, which can assign workloads based on a node's availability and/or health, disables the primary device or system 305 so it is no longer used by the rest of the system while in a fail state. In this way, the secondary device or system 306 becomes the primary device and the primary device or system 305 is taken offline for repair. The secondary device or system 306 is capable of replacing the functionality of the failed node and allows the system to continue normal operation.

The repair module 230 is configured to repair the primary device or system 306 while it is offline. The repair module 230 could, for example, force a power cycle on the primary device or system 305 it in the memory area that identified the fault. In one example, a user command to reset or repair the failed node can be used by a repair module 230 to fix the failed node. In other examples, it can be repaired automatically by the repair module 230. This eliminates the need to have someone physically interact with the node, which is especially useful when control nodes are located in a process area and it is desirable not to have to travel to the node. This may also eliminate the need to open the cabinet enclosure, which could require a work permit.

In another example, the primary device or system 305 can be caused to automatically reboot from its stored program memory. In this manner, the fault can be cleared through memory subsystem power of one of the failed nodes by the repair module 230. In another example, the repair module 230 can repair a failed node with a stuck bit by resetting the memory and restoring a database 399. An error correction module 355 can also be used. For example, once the repair module 230 reloads the database 399, the error correction module 355 can use an internal checkpoint and diagnose that a flash memory and database checksum are intact. Once the repair module 230 repairs the failed node it can return the system to an operational status with the repaired failed node as a secondary subsystem with the current replacement node as the primary. More details on how redundant systems can operate are shown in the Redundancy Patent and omitted here for brevity.

Control system 300 also can write to a fault log 250 and an event log 260. In one example, when the control system 300 automatically repairs the fault, it also updates the fault log 250. The fault log 250 can be sent to the database 399 so there is a record of each action the control system 300 takes. In the example where control system 300 performs successive repairs and/or the same fault it updates the event log 260. The event log 260 can be used by a human operator to understand that a portion of the overall system has degraded behavior and might need to take additional actions.

Figure 4:
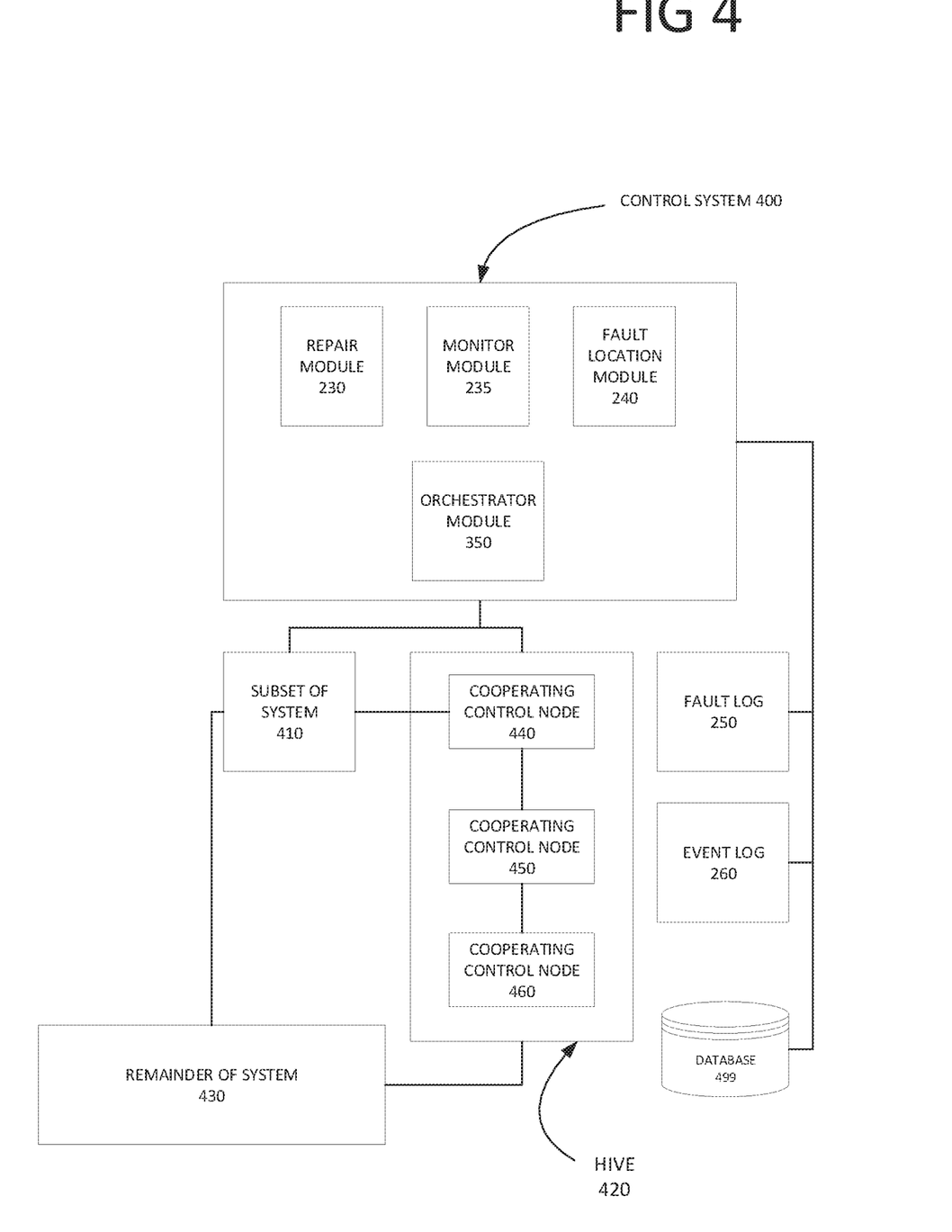
FIG. 4 is a simplified block diagram of the self-healing control system.

FIG. 4 is a simplified block diagram of self-healing control system 400. The self-healing control system 400 of FIG. 4 is coupled to a subset of the system 410 and a HIVE 420. The subset of the system 410 is coupled to the remainder of the system 430. The self-healing control system 400 includes a monitor module 235. In operation, the monitor module 235 waits until the subset of the system 410 fails. For example, the subset of the system 410 might have stuck bits. In this case, the monitor module 235 detects that there is a fault in the system. The fault location module 240 determines that the subset of the system 410 has entered the fail state.

In one example, the HIVE functionality block 405 comprises cooperating control nodes 440, 450, and 460. The node with a non-correctable fault would shed its workloads as per HIVE redundancy design, and then auto-reboot with a power cycle of the memory region with the bit fault. This returns the failed node to operational mode. Thereafter, the orchestrator module 350 can assign workloads back to the subset of the system 410 as per the needs of the HIVE. More details on how the HIVE can operate are shown in the HIVE Patent and omitted here for brevity. It should be noted, however, that the repaired node 410 can return to operational status as a member of the HIVE and would typically not receive the same workload it had before the fault condition occurred. In a manner similar to that described with respect to FIG. 3, a failed primary, once repaired can be maintained as the secondary device. In the case of the HIVE, a failed node can be incorporated into the HIVE once repaired and would take on a new state that is different from the old state before the node failed.

To that end, the repair module 230 is configured to repair the subset of the system 410 while it is offline. Control system 400 also can write to a fault log 250 and an event log 260. In one example, when the control system 400 automatically repairs the fault, it also updates the fault log 250. The fault log 250 can be sent to a historical database 499 so there is a record of each action the control system 300 takes. In the example where control system 400 performs successive repairs and/or the same fault it updates the event log 260. The event log 260 can be used by a human operator to understand that a portion of the overall system has degraded behavior and might need to take additional actions.

Figure 5:
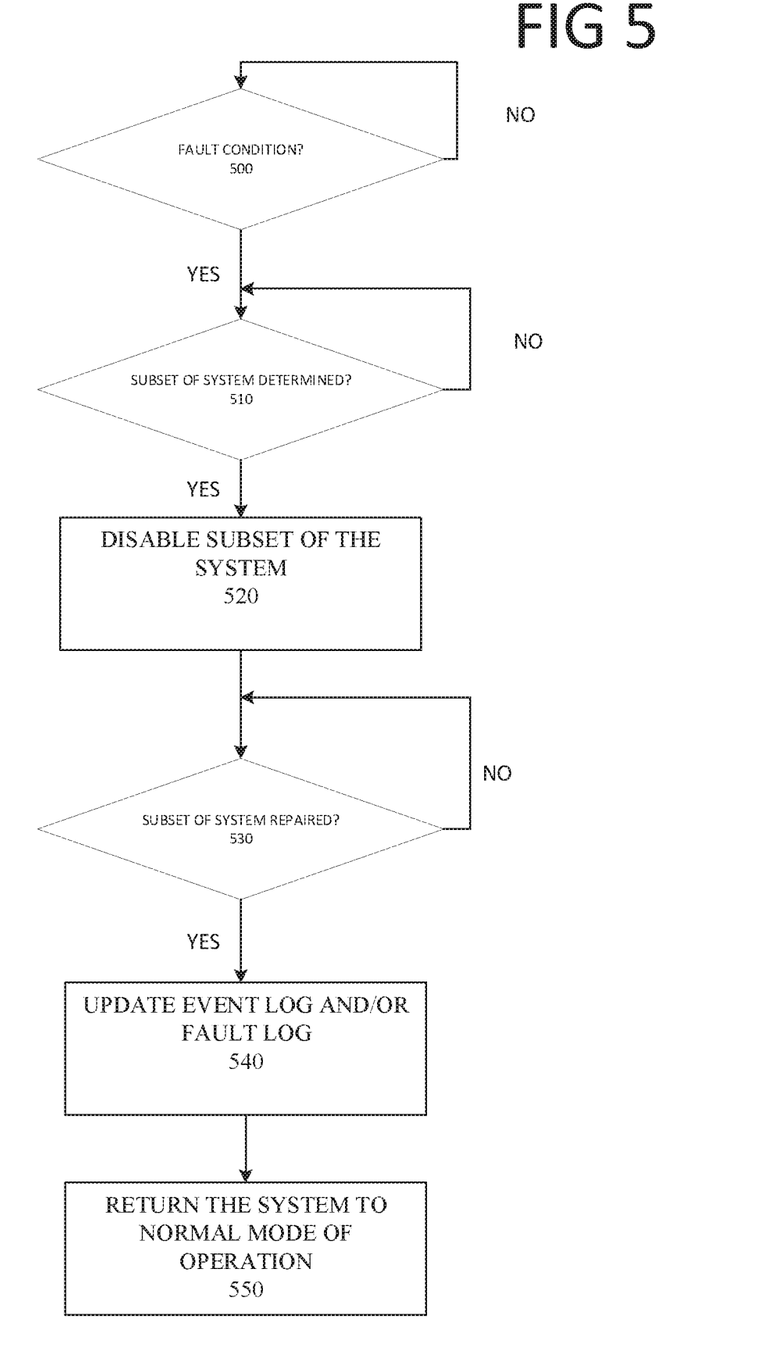
FIG. 5 is a flowchart that illustrates the present use of the self-healing process control system.

FIG. 5 is a flowchart that illustrates the present use of a self-healing process control system. At step 500, the system determines if there is a fault condition. Typically, the system will operate normally and any of the nodes within the system that are capable of having a transitory fault class, such as a stuck bit, will not have that condition. Hence, step 500 will continue until a fault is detected. Once the system detects a fault, the system uses logic to determine where the fault is within the larger system at step 510.

At step 520, the failed subset of the system is disabled. At step 530, the system determines whether the subset of the system has been repaired. This can occur, for example, via a repair module or other mechanism that is capable of isolating the subset of the system that failed and automatically cause it to be repaired. One manner in which this occurs can be having a power cycle forced upon it in the memory area that identified the fault. In another example, a user command to reset or repair the failed node can be used by a repair module to fix the failed node. In yet another example, one of the failed nodes can be caused to automatically reboot from its stored program memory. In this manner, the fault can be cleared through memory subsystem power of one of the failed nodes by the repair module. In yet another example, the repair module can repair a failed node with a stuck bit by resetting the memory and restoring the database. Once the system is repaired, an action is performed, which could include updating a fault log and/or an event log at step 540.

Figure 6:
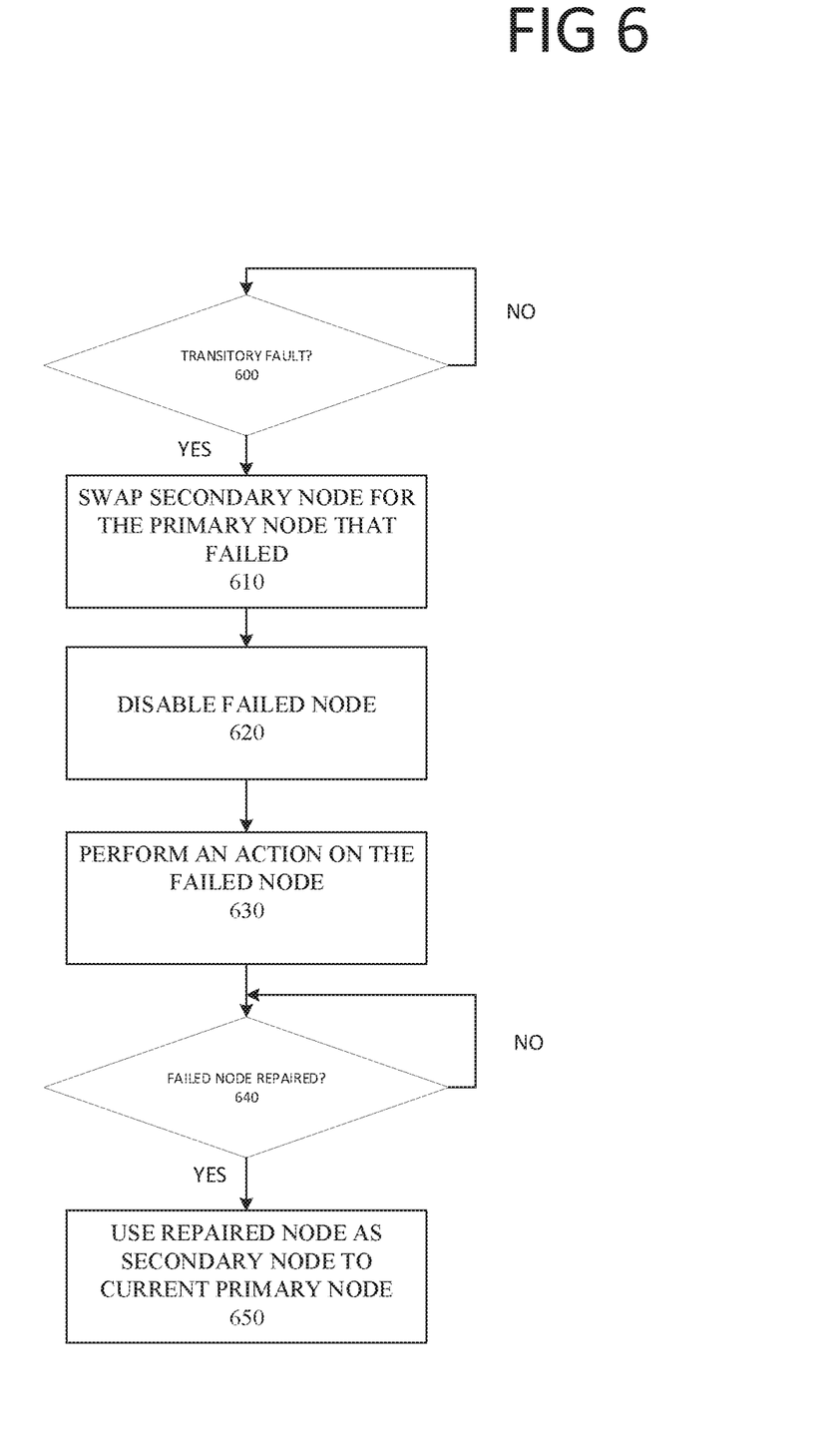
FIG. 6 is a flowchart that illustrates the present use of the self-healing process control system.

FIG. 6 is a flowchart that illustrates the present use of a self-healing process control system. At step 600, the system determines if there is a transitory fault, such as a soft error, a stuck bit in field-programmable logic (FPL), a stuck bit in a field-programmable gate array (FPGA), or a stuck bit in an a system-on-chip device (SoC). Hence, step 600 will continue until a fault is detected in a primary system. Once the system detects a fault, the system uses logic at step 610 swaps a secondary is-node in place of the failed primary node with the transitory fault.

When a secondary node is swapped for a failed primary node, the primary node is disabled at step 620. At step 640, at least one action is performed on the failed node. In one example, this includes a memory reset and/or a database operation on the failed node. The database operation could be, for example, a database synchronization with an active primary. Thereafter, at step 640 the system determines whether the failed node is repaired. Step 640 repeats until the failed node is repaired, in which case at step 650, the repaired, failed node is used as a secondary node to the current primary node. In other examples, the repaired, failed node could become the primary node. Other schemes are possible as well.

Figure 7:
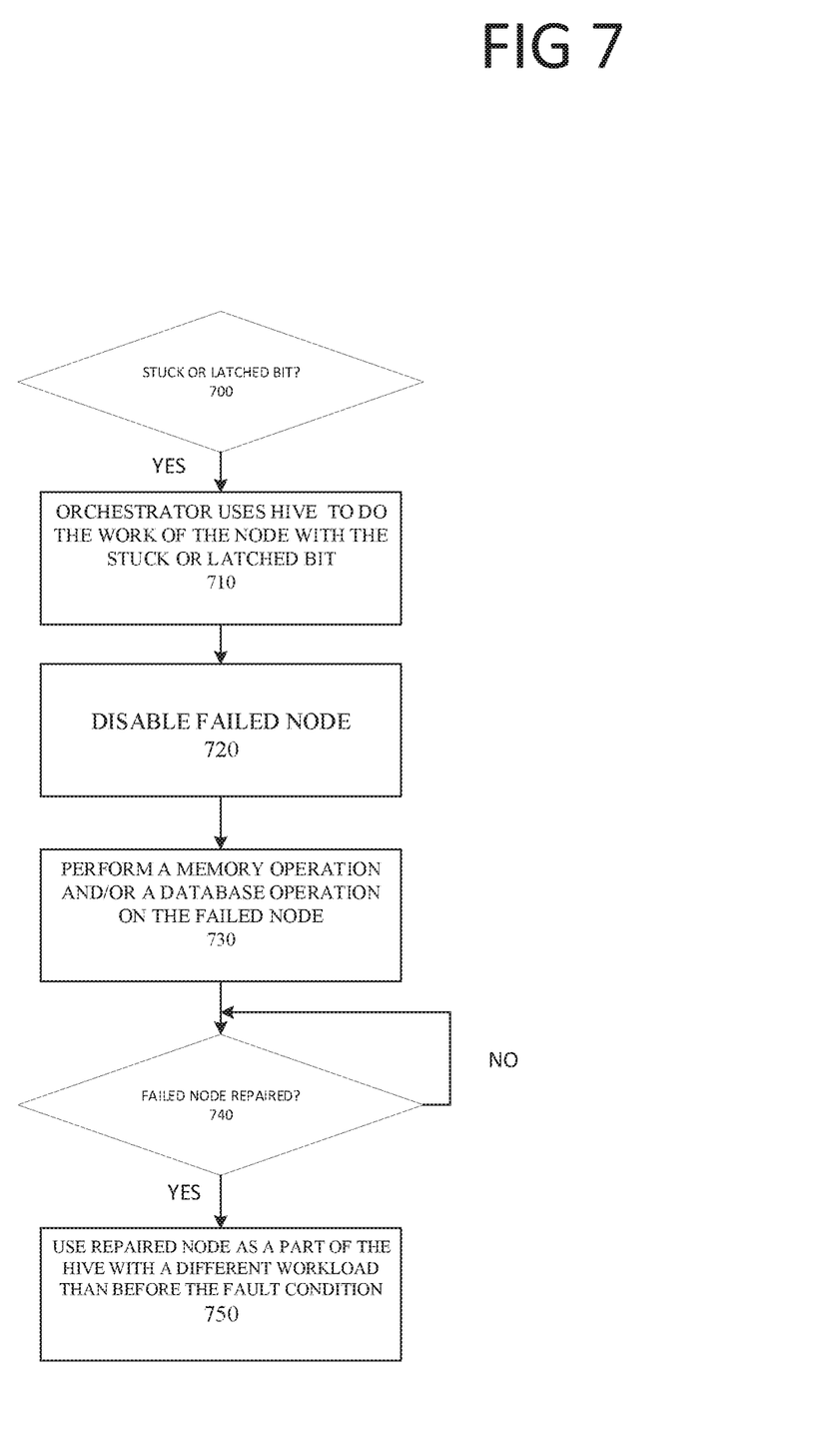
FIG. 7 is a flowchart that illustrates the present use of the self-healing process control system.

FIG. 7 is a flowchart that illustrates the present use of a self-healing process control system. At step 700, the system determines if a node has a stuck or latched bit. Step 700 repeats until a fault is detected. Once the system detects the stuck or latched bit in a node, an orchestrator can assign the failed node's workload to the HIVE at step 710. At step 720, the orchestrator can disable the failed node. At step 730, the system performs a memory operation and/or a database operation on the failed node. This can include, for example, a power cycle forced in the memory area that identified the fault, a reboot from its stored program memory, resetting the memory and restoring a database, and others schemes as well.

At step 740, the system determines whether the failed node has been repaired. If not, step 740 repeats. After the failed node is repaired, it is used in the future, in one example, as part of the HIVE and can be assigned workloads by an orchestrator as needed. It should be noted that, after the fault condition is repaired, the repaired node typically has a differing workload than before and is integrated into the HIVE. There may no longer be a need for the repaired node to continue operation using the same workload it had before it failed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. One or more hardware-based non-transitory memory devices storing computer-readable instructions which, when executed by one or more processors disposed in a computing device included in a self-healing control system, cause the computing device to:

monitor a logic block and a memory block included in a subset of the system to detect a fault condition of stuck bits related to the subset of the system, wherein the logic block and the memory block includes at least one of field-programmable logic (FPL), a field-programmable gate array (FPGA), or a system-on-chip device;

determine the subset of the logic block or the memory block that is impacted by the fault condition, wherein a node comprising the logic block or memory block impacted by the fault condition is determined to be a failed node in a fail state; and swap the subset of the logic block or the memory block for a second logic block or a second memory block, the second logic block or the second memory block being capable of carrying out the functions of the subset of the logic block or the memory block;

disable the subset of the logic block or the memory block while the failed node is in the fail state;

automatically repair the subset of the logic block or the memory block impacted by the fault condition, wherein the repaired subset of the logic block or the memory block causes the failed node to return to an operational mode, automatically repair the subset of the logic block or the memory block impacted by the fault condition, wherein the repaired subset of the logic block or the memory block causes the failed node to return to an operational mode, wherein automatically repair comprising at least one of manner:

provide power cycle upon a memory area in the memory block that identified the fault, reset, by a repair module, to fix the failed node based on a user command, reboot the failed node from the memory block to clear through memory subsystem power of one of the failed nodes by the repair module, and repair a failed node with a stuck bit by resetting the memory and restoring a database; and perform at least one action with respect to the subset of the logic block and the memory block comprising updating a fault log and/or an event log to record each action taken by the self-healing control system.

2. The one or more hardware-based non-transitory memory devices of claim 1, wherein performing at least one action causes the computing device to:
disable the logic block and the memory block;
repair the logic block and the memory block; and
enable the logic block and the memory block.

3. The one or more hardware-based non-transitory memory devices of claim 2, wherein the memory devices are selected from a group consisting of a field-programmable logic, a field-programmable gate array, or a system-on-chip device.

4. The one or more hardware-based non-transitory memory devices of claim 3 wherein the fault condition is selected from a group consisting of a soft error, a stuck bit in a field-programmable logic, a stuck bit in a field-programmable gate array, or a stuck bit in a system-on-chip device.

5. The one or more hardware-based non-transitory memory devices of claim 1, wherein performing at least one action causes the computing device to:

update a fault log with a first data item associated with the fault condition in the logic block and the memory block.

6. The one or more hardware-based non-transitory memory devices of claim 1 wherein performing at least one action causes the computing device to:
update an event log with a second data item associated with the at least one action.

7. A method comprising:

monitoring a logic block and a memory block included in a subset of a self-healing control system to detect a fault condition of stuck bits related to the subset of the system, wherein the logic block and the memory block includes at least one of field-programmable logic (FPL), a field-programmable gate array (FPGA), or a system-on-chip device;

determining the subset of the logic block or the memory block that is impacted by the fault condition, wherein a node comprising the logic block or memory block impacted by the fault condition is determined to be a failed node in a fail state; and swapping the subset of the logic block or the memory block for a second logic block or a second memory block, the second logic block or the second memory block being capable of carrying out the functions of the subset of the logic block or the memory block;

disabling the subset of the logic block or the memory block;

automatically repairing the subset of the logic block or the memory block impacted by the fault condition, wherein the repaired subset of the logic block or the memory block causes the failed node to return to an operational mode, wherein automatically repair comprising at least one of manner:

provide power cycle upon a memory area in the memory block that identified the fault, reset, by a repair module, to fix the failed node based on a user command, reboot the failed node from the memory block to clear through memory subsystem power of one of the failed nodes by the repair module, and repair a failed node with a stuck bit by resetting the memory and restoring a database; and performing at least one action with respect to the subset of the logic block or the memory block comprising updating a fault log and/or an event log to record each action taken by the self-healing control system.

8. The method of claim 7 further comprising:
designating the logic block and the memory block as a primary system; and
designating the second logic block and the second memory block as a secondary system.

9. The method of claim 8 wherein the step of performing at least one action on the logic block and the memory block further comprises maintaining the secondary system as the primary system after the subset of the logic block or the memory block is repaired.

10. The method of claim 7, wherein the logic block and the memory block are incorporated into one or more devices selected from a group consisting of a field-programmable logic, a field-programmable gate array, or a system-on-chip device.

11. The method of claim 10 wherein the fault condition is selected from a group consisting of a soft error, a stuck bit in a field-programmable logic, a stuck bit in a field-programmable gate array, or a stuck bit in a system-on-chip device.

12. The method of claim 7 wherein the step of performing further comprises:
  updating a fault log with a first data item associated with the fault condition in the logic block and the memory block.

13. The method of claim 7 wherein the step of further comprises:
  updating an event log with a second data item associated with the at least one action.

14. A self-healing control system comprising:
  at least one processing device configured to:
    monitor a logic block and a memory block included in a subset of the system to detect a fault condition of stuck bits related to the subset of the system, wherein the logic block and the memory block includes at least one of field-programmable logic (FPL), a field-programmable gate array (FPGA), or a system-on-chip device;
    determine the subset of the logic block or the memory block that is impacted by the fault condition, wherein a node comprising the logic block or memory block impacted by the fault condition is determined to be a failed node in a fail state; and
    swap the subset of the logic block or the memory block for a highly integrated virtual environment (HIVE), the HIVE being capable of carrying out the functions of the subset of the logic block or the memory block;
    disable the subset of the logic block or the memory block while the failed node is in the fail state; and
    automatically repair the subset of the logic block or the memory block impacted by the fault condition, wherein the repaired subset of the logic block or the memory block causes the failed node to return to an operational mode, wherein automatically repair comprising at least one of manner:
      provide power cycle upon a memory area in the memory block that identified the fault,
      reset, by a repair module, to fix the failed node based on a user command,
      reboot the failed node from the memory block to clear through memory subsystem power of one of the failed nodes by the repair module, and
      repair a failed node with a stuck bit by resetting the memory and restoring a database; and
    perform at least one action with respect to the subset of the logic block or the memory block comprising updating a fault log and/or an event log to record each action taken by the self-healing control system.

15. The device of claim 14 wherein the at least one action includes automatically repairing the subset of the logic block or the memory block.

16. The device of claim 14, wherein the logic block and the memory block are incorporated into one or more devices selected from a group consisting of a field-programmable logic, a field-programmable gate array, or a system-on-chip device.

17. The device of claim 16 wherein the fault condition is selected from a group consisting of a soft error, a stuck bit in a field-programmable logic, a stuck bit in a field-programmable gate array, or a stuck bit in a system-on-chip device.

18. The device of claim 14 further comprising a fault log with a first data item associated with the fault condition in the logic block and the memory block.

19. The device of claim 14 further comprising an event log with a second data item associated with the at least one action.

20. The device of claim 14, wherein the repaired subset of the logic block or the memory block is incorporated into the HIVE.

* * * * *